Oct. 11, 1966 O. M. HART 3,278,835
REMOTELY CONTROLLABLE CURRENT REGULATOR APPARATUS
Original Filed Sept. 21, 1962
8 Sheets-Sheet 1
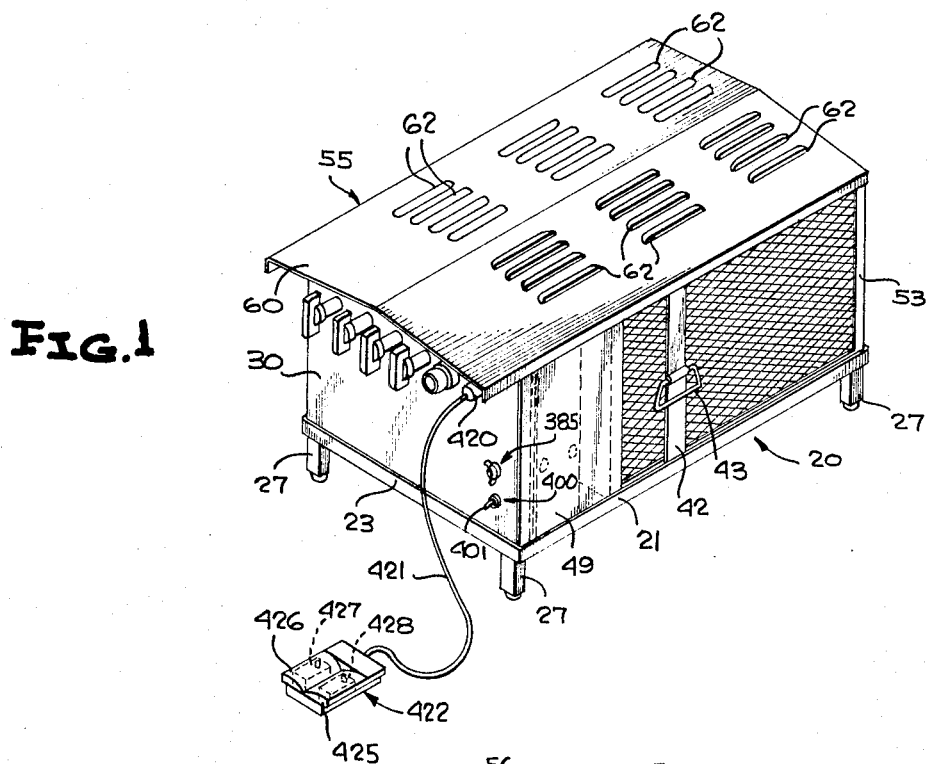
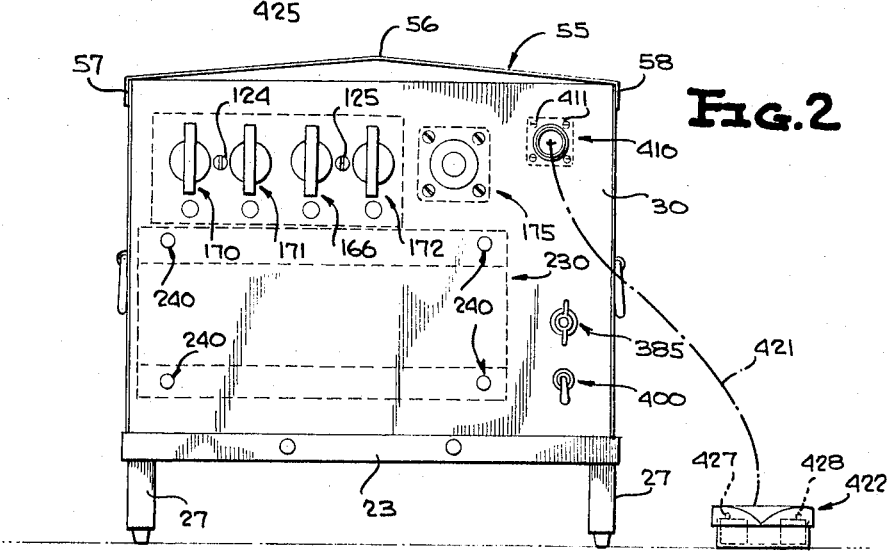
INVENTOR
OLIVER M. HART
BY Shoemaker and Mattare
ATTORNEYS Oct. 11, 1966 O. M. HART 3,278,835
REMOTELY CONTROLLABLE CURRENT REGULATOR APPARATUS
Original Filed Sept. 21, 1962 8 Sheets-Sheet 2

INVENTOR
OLIVER M. HART
BY
Shoemaker and Mattare
ATTORNEYS

Oct. 11, 1966     O. M. HART     3,278,835
REMOTELY CONTROLLABLE CURRENT REGULATOR APPARATUS
Original Filed Sept. 21, 1962     8 Sheets-Sheet 3

INVENTOR
OLIVER M. HART
BY
Shoemaker and Mattare
ATTORNEYS

Oct. 11, 1966     O. M. HART     3,278,835
REMOTELY CONTROLLABLE CURRENT REGULATOR APPARATUS
Original Filed Sept. 21, 1962     8 Sheets-Sheet 4
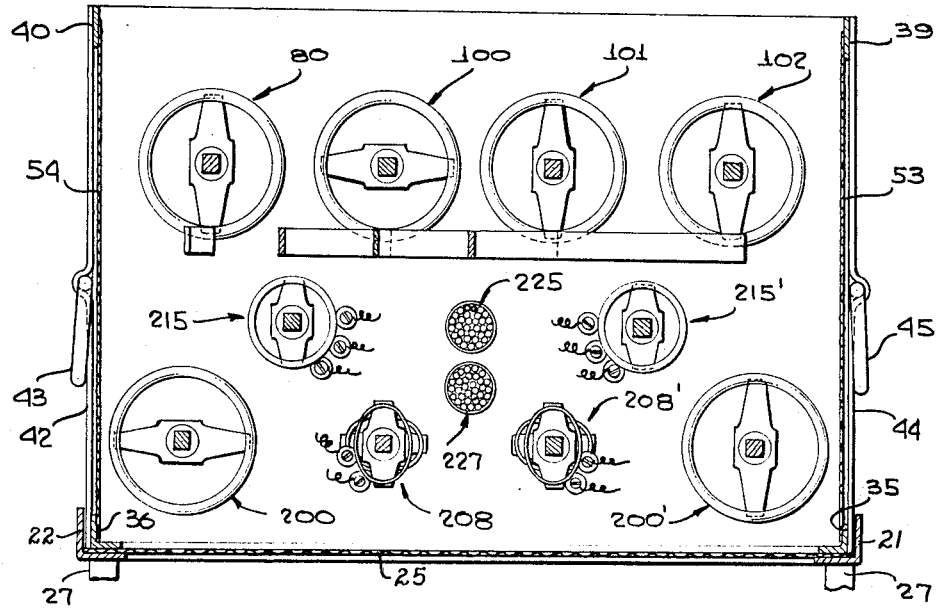
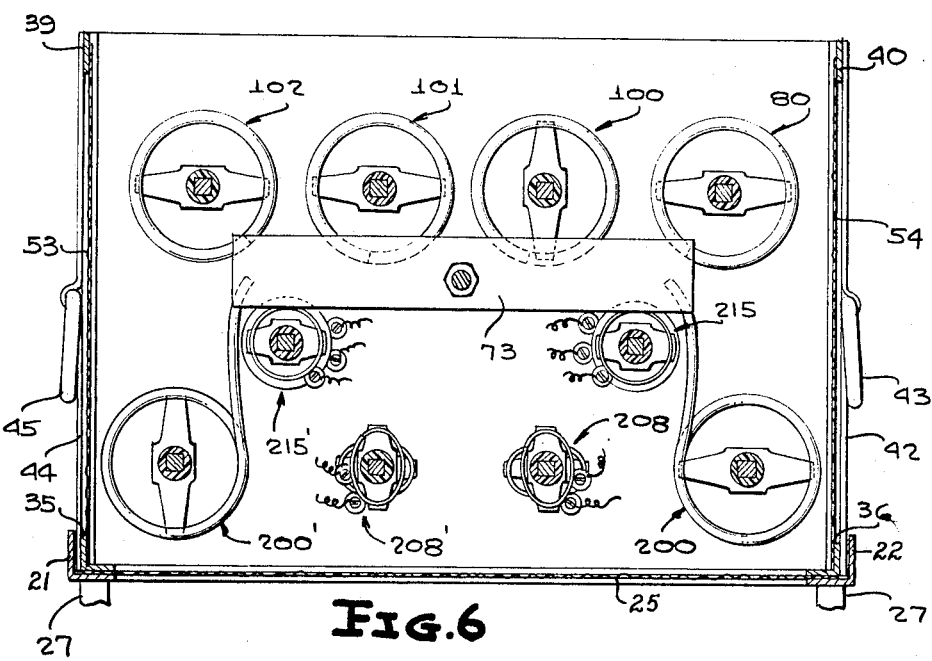
INVENTOR
OLIVER M. HART
BY Shoemaker and Mattare
ATTORNEYS Oct. 11, 1966     O. M. HART     3,278,835
REMOTELY CONTROLLABLE CURRENT REGULATOR APPARATUS
Original Filed Sept. 21, 1962     8 Sheets-Sheet 5
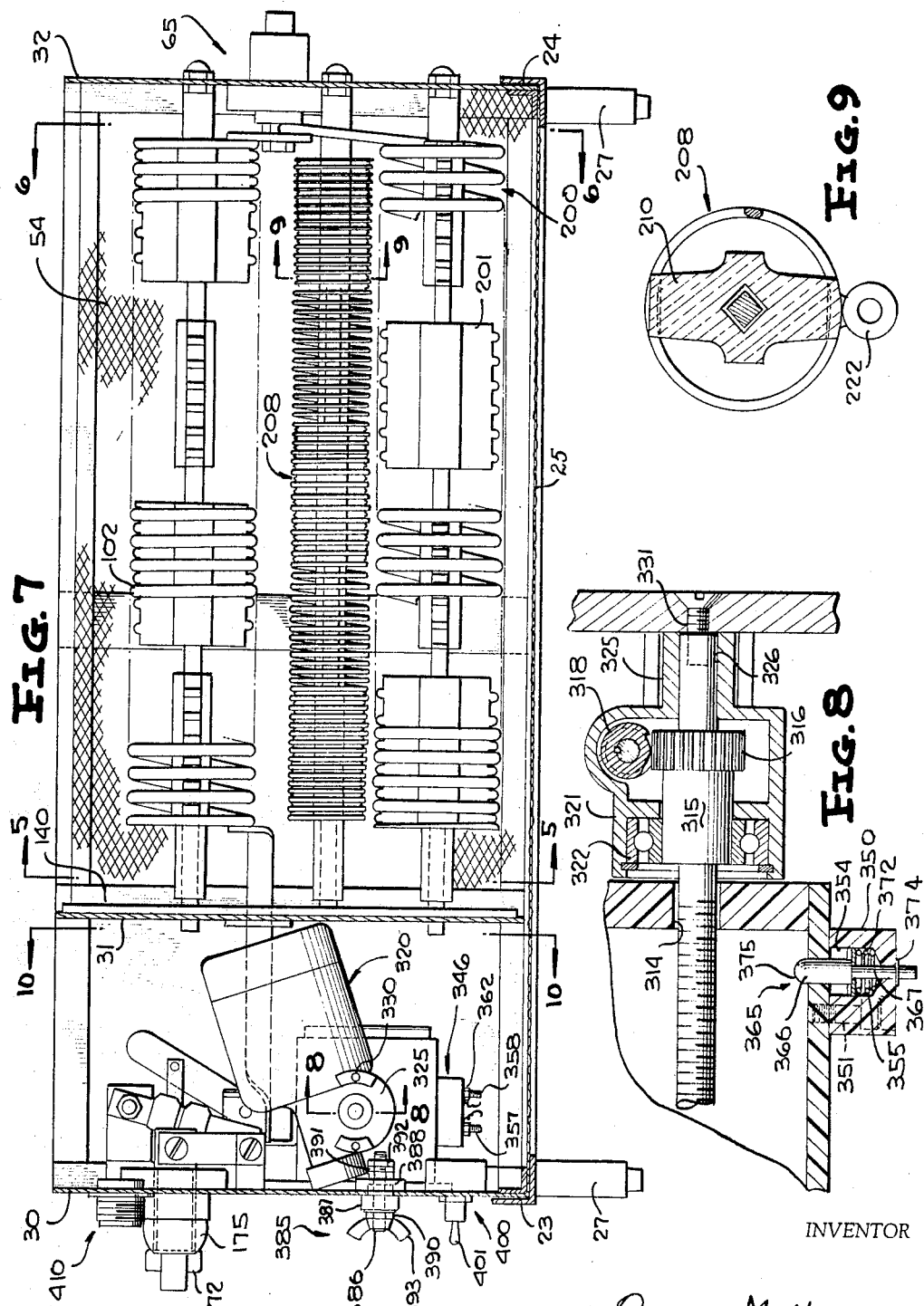
INVENTOR
OLIVER M. HART
BY Shoemaker and Mattare
ATTORNEYS

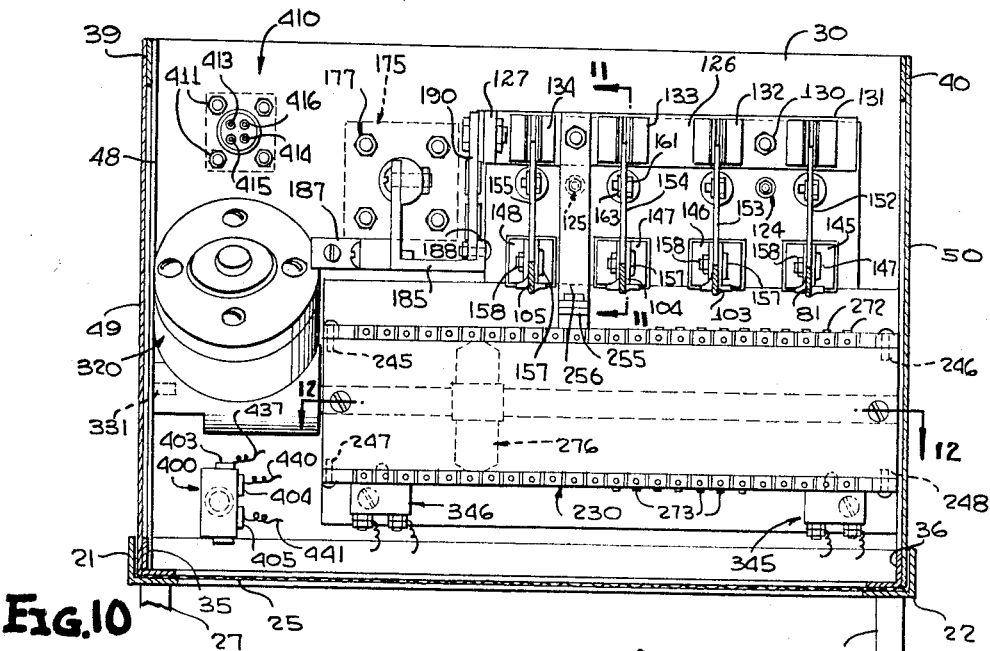
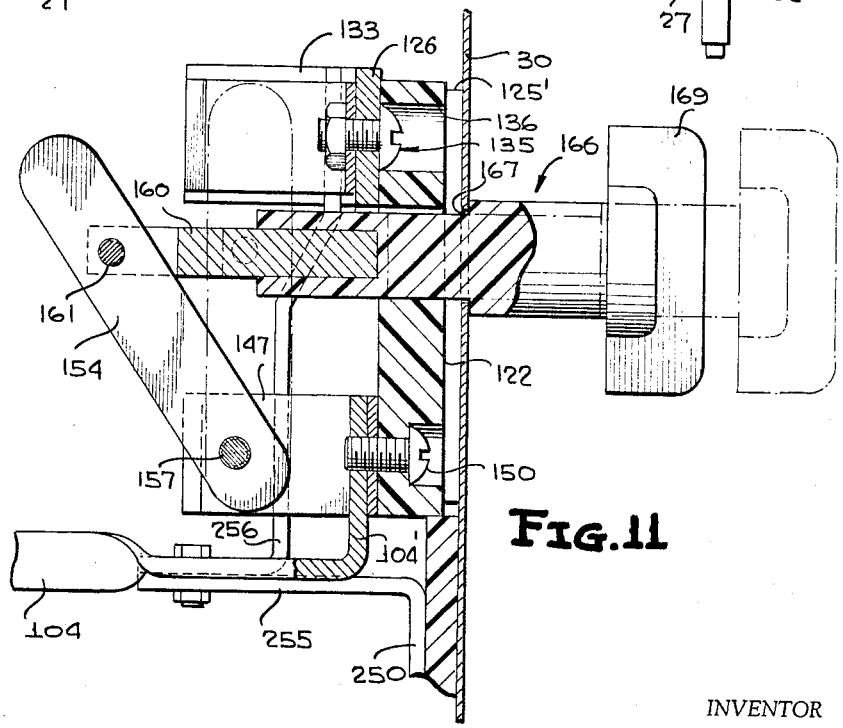

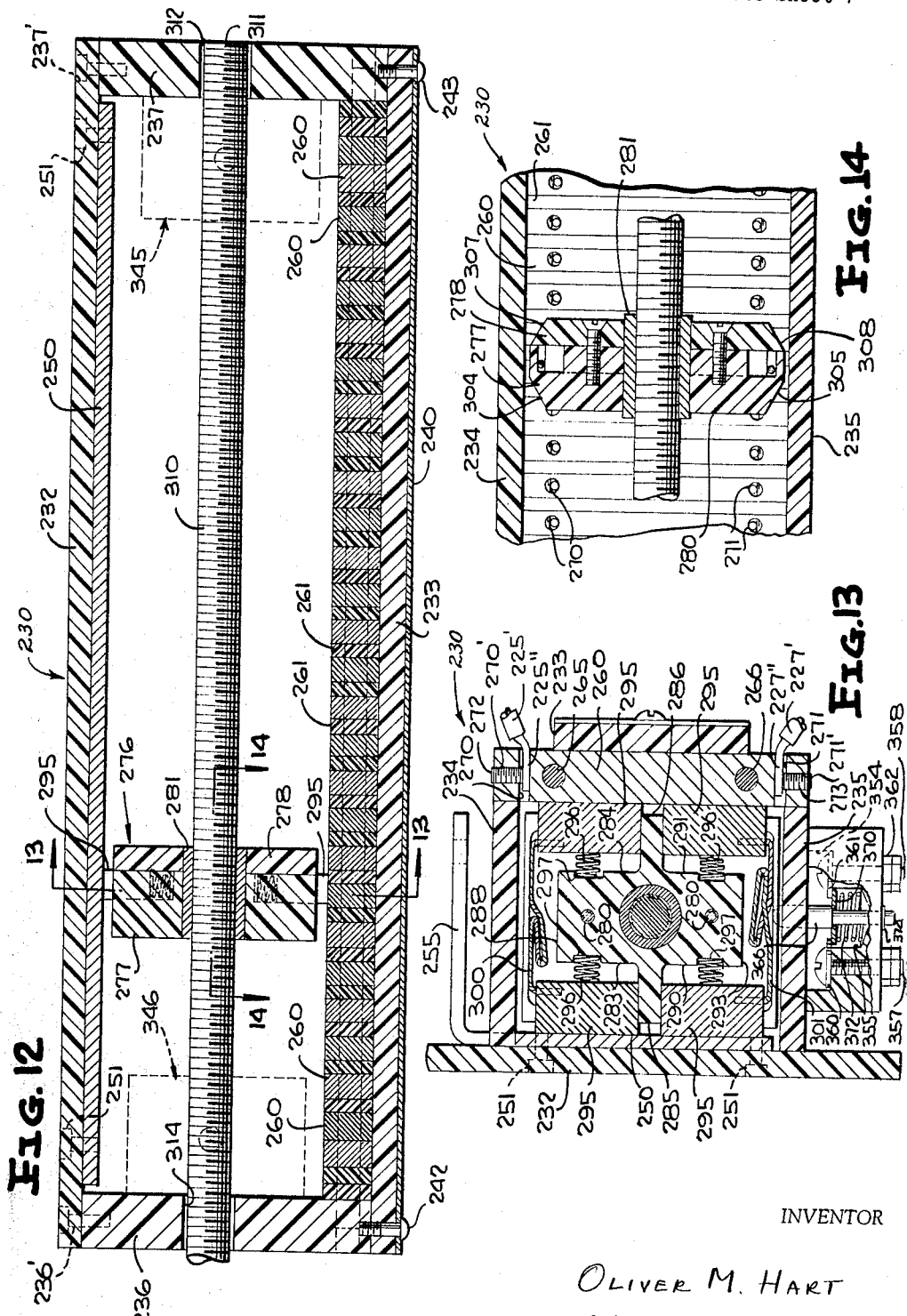

Oct. 11, 1966            O. M. HART            3,278,835
REMOTELY CONTROLLABLE CURRENT REGULATOR APPARATUS
Original Filed Sept. 21, 1962            8 Sheets-Sheet 8
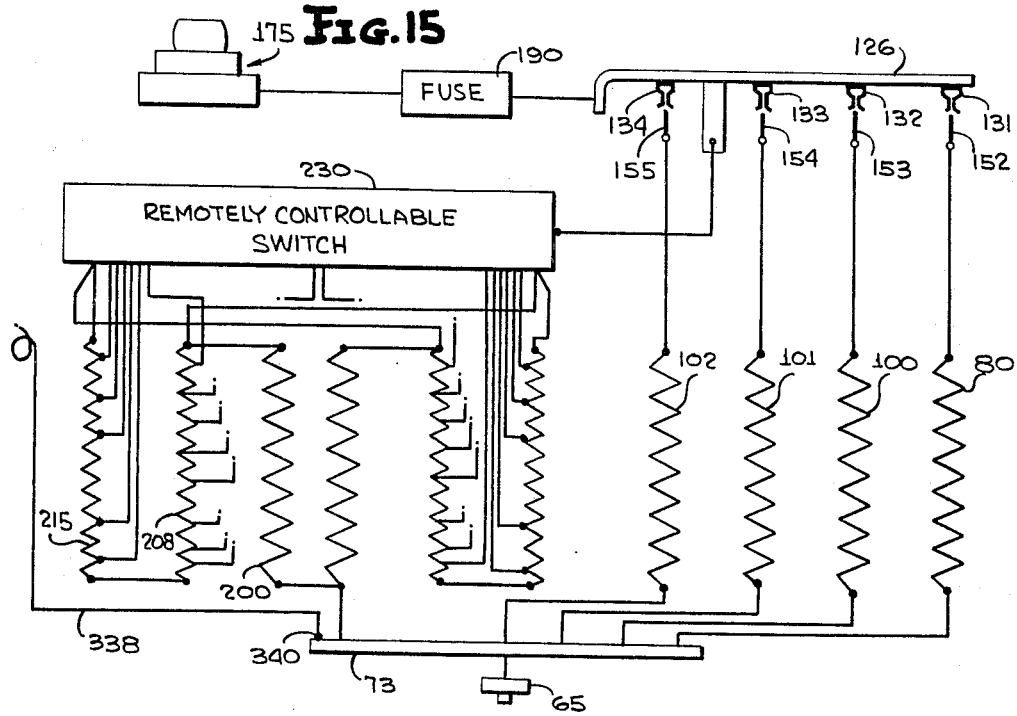
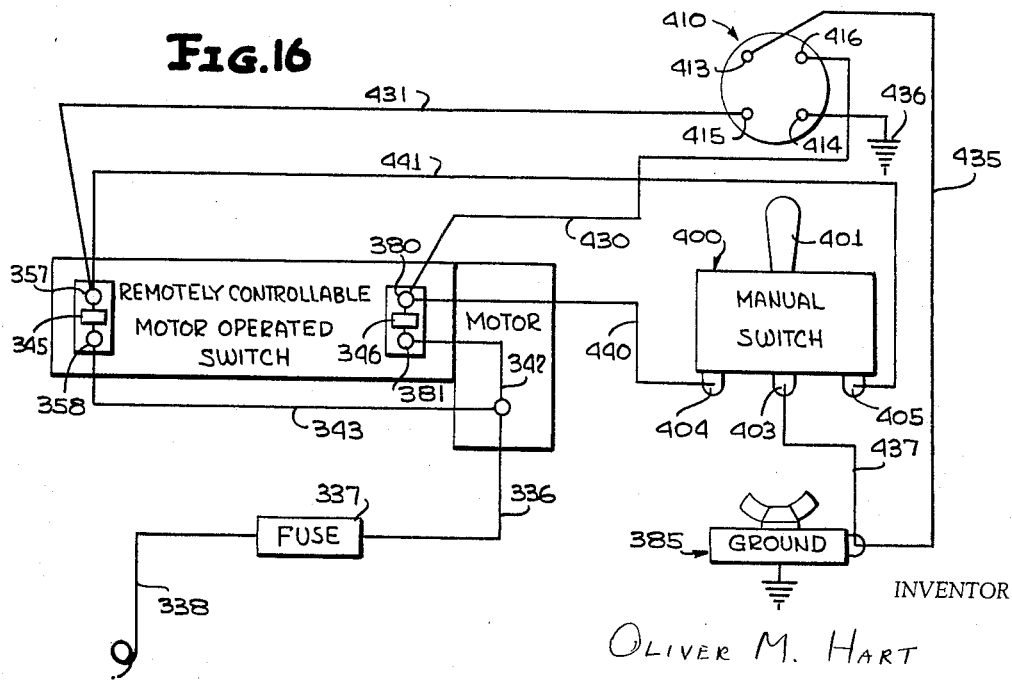
INVENTOR
OLIVER M. HART
BY Shoemaker and Mattare
ATTORNEYS

United States Patent Office 3,278,835
Patented Oct. 11, 1966

3,278,835
REMOTELY CONTROLLABLE CURRENT
REGULATOR APPARATUS
Oliver M. Hart, Cornwall Bridge, Conn.
Continuation of application Ser. No. 225,269, Sept. 21, 1962. This application Nov. 29, 1965, Ser. No. 516,204
6 Claims. (Cl. 323—94)

This application is a continuation application of my copending U.S. patent application, Serial No. 225,269, filed September 21, 1962, now abandoned.

The present invention relates to new and novel remotely controllable current regulator apparatus and more particularly to apparatus which is especially adapted to supply current to welding equipment.

The present invention is particularly adapted for use in multi-operator welding systems wherein a constant electrical potential is provided, and some sort of current regulator is utilized by the individual welders for controlling the amount of welding current in accordance with the particular job situation.

It has been a common practice in the prior art to provide current regulators which can be manually adjusted so as to regulate the welding current by certain increments so as to obtain optimum welding conditions. Such regulators generally have taken the form of variable resistors which are controlled by manually operated switches so as to adjust the amount of welding current. Many of these devices are limited in use because of the fact that the switch means is adapted only for adjusting the current within certain limits, and in many cases, the optimum welding current can not be accurately obtained because the switch means does not permit a sufficiently fine adjustment.

It is accordingly a feature of the present invention to provide an arrangement whereby the welding current can be adjusted in very small increments whereby the optimum welding conditions can be readily obtained.

A first important consideration has arisen particularly in recent years when welding is carried out with certain new and exotic metals. In present day technology, many of the materials employed are difficult to weld and raise special welding problems wherein the welding current becomes a critical feature. In fact, the welding current becomes so critical in many instances that in order to obtain the desired weld, it is necessary for the individual welder to continuously adjust the welding current in accordance with the thickness of the material being welded and various other operating conditions.

Accordingly, the present invention is especially constructed to provide an arrangement which permits the welding current to be continuously changed while the welding operation is being carried out. In order to accomplish this desired result, a remotely controllable switch means is provided which may be readily operated by the foot of a welder such that the welder can remotely control the current regulator apparatus so as to change the welding current in small increments while he is welding thereby ensuring that optimum welding conditions will be provided at all times.

The present invention incorporates an arrangement wherein the apparatus comprises a compact unit having an input means which is adapted to be connected to a suitable source of electrical energy such as a constant 80 volt D.C. power source. The apparatus also includes an output which is adapted to be connected by means of a conventional welding cable to my suitable welding equipment. On the other hand, it should also be clearly understood that the apparatus is not limited to use with welding systems, but can be used in any application wherein it is desired to remotely regulate the current.

A first plurality of resistances are provided between the input and the output means, these resistances providing rather large steps in the amount of amperage provided therethrough, each of these resistances being connectable with the output means by individually manually controllable switches. In addition, a second resistance means is provided which has many leads tapped thereinto at various points therealong such that each of the leads is adapted to carry a different amount of current in relatively small increments. For example, the large resistances previously mentioned may provide 40 ampere increments of adjustment, whereas the leads later referred to may carry current in increments of 2 amperes difference.

These various latter leads are in turn connected with a remotely operable switch means which is adapted to sequentially connect the leads to the output so as to vary the output current over a relatively wide range of occurrence in small steps.

The remotely operated switch means is driven by a power operated device such as an electric motor, operation of the electric motor being controlled from a remote foot switch as previously described.

Limit stop means is also provided for limiting the movement of the remotely controlled switch in opposite directions while a manually operable switch is mounted directly on the unit to provide an auxiliary control for the drive motor.

In the present invention, the second resistance means referred to above actually comprises a dual system wherein two parallel sets of resistances are provided as will hereinafter more clearly appear, each of these parallel resistance paths being adapted to carry half of the current. It should be noted that this dual system could actually be replaced by a single system which would carry all of the current, the dual arrangement being provided because of certain design considerations which permit the over-all dimensions of the apparatus to be drastically reduced thereby making a much more compact and cheaper arrangement from a construction standpoint.

An object of the present invention is to provide a new and novel remotely controllable current regulator which is particularly adapted for use with welding equipment and which includes switch means for providing a readily adjustable current over a wide range.

Another object of the invention is the provision of a remotely controllable current regulator including means for remotely controlling the adjustment of the current in relatively small increments of amperage.

A further object of the invention is to provide limit stop means for limiting the movement of the remotely controlled switch means of the invention in opposite directions.

A still further object of the invention is to provide remotely controllable current regulator apparatus which is relatively simple and inexpensive in construction and yet quite sturdy and reliable in use.

Other objects and many attendant advantages of the invention will become more apparent when considered in connection with the specification and accompanying drawings, wherein:

FIG. 1 is a top perspective view of the over-all unit of the present invention;

FIG. 2 is a front view of the unit shown in FIG. 1;

FIG. 5 is a section view taken substantially along line 5—5 of FIG. 7 looking in the direction of the arrows;

FIG. 6 is a view taken substantially along line 6—6 of FIG. 7 looking in the direction of the arrows;

FIG. 7 is a side view of the apparatus with the side wall portion thereof removed for the sake of clarity;

FIG. 8 is a sectional view taken substantially along line 8—8 of FIG. 7 looking in the direction of the arrows;

FIG. 9 is a sectional view taken substantially along line 9—9 of FIG. 7 looking in the direction of the arrows;

FIG. 10 is a sectional view taken substantially along line 10—10 of FIG. 7 looking in the direction of the arrows;

FIG. 11 is a sectional view taken substantially along line 11—11 of FIG. 10 looking in the direction of the arrows;

FIG. 12 is a sectional view taken substantially along line 12—12 of FIG. 10 looking in the direction of the arrows;

FIG. 13 is a sectional view taken substantially along line 13—13 of FIG. 12 looking in the direction of the arrows;

FIG. 14 is a sectional view taken substantially along line 14—14 of FIG. 12 looking in the direction of the arrows;

FIG. 15 is a schematic wiring diagram indicating diagrammatically the general resistance wiring arrangement of the present invention; and FIG. 16 is a schematic wiring diagram indicating schematically the wiring for operating of the remotely controlled switch means.

Figure 3:
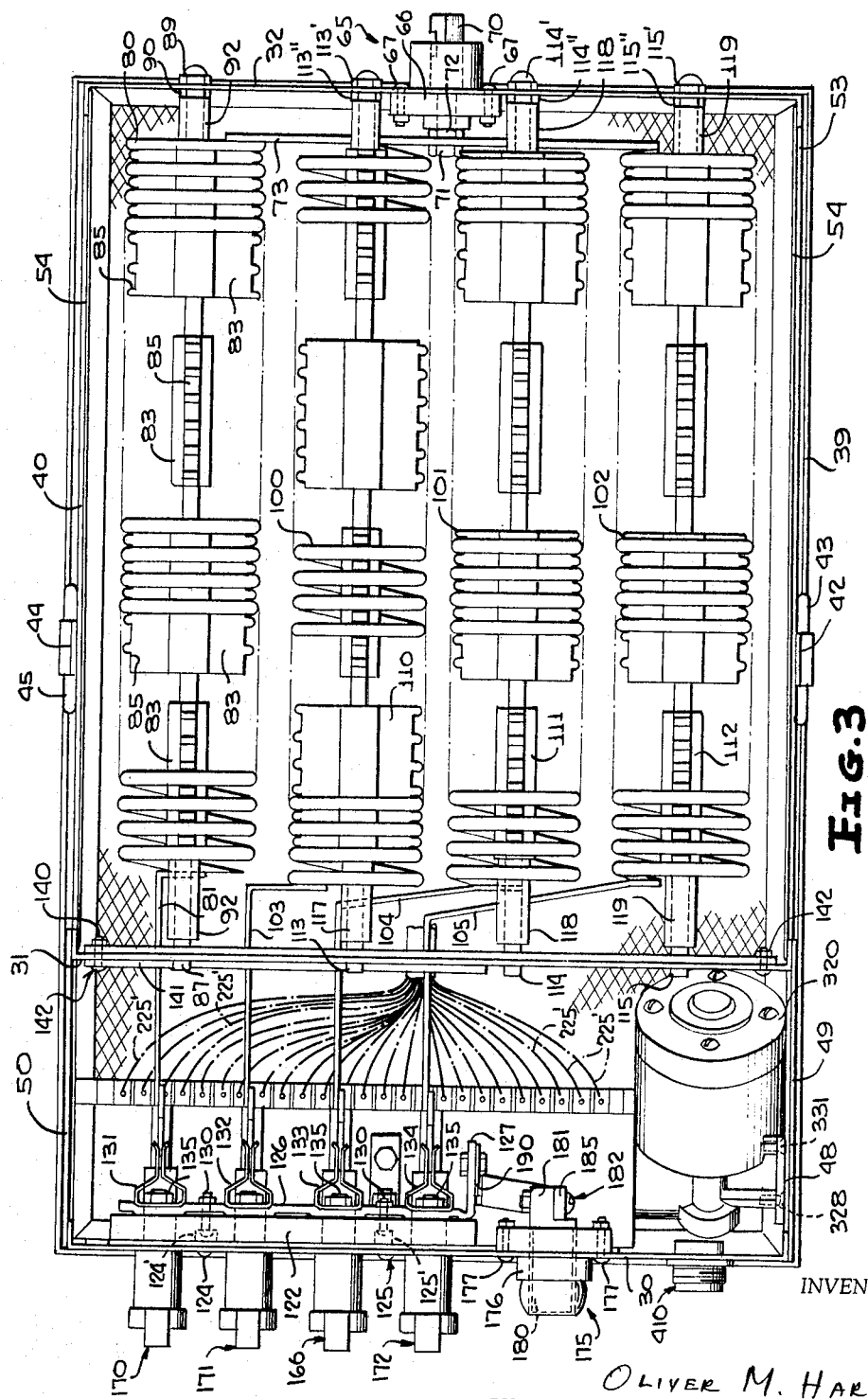
FIG. 3 is a top view of the unit with the cover member removed.

Referring now to the drawings wherein like reference characters designate corresponding parts throughout the several views, as seen most clearly in FIGS. 1–7 inclusive, a supporting framework for the unit according to the present invention comprises a supporting base indicated generally by reference numeral 20, this base portion being substantially rectangular in configuration and comprising a pair of longitudinally extending channel portions 21 and 22 which are connected at the opposite ends thereof by a pair of transverse channel portions 23 and 24, these various channel portions being suitably secured to one another as by welding or the like to form a rigid rectangular frame.

A sheet of expanded metal 25 is supported on the inwardly extending leg portions of the various channels and suitably secured thereon so as to prevent the entry of undesired objects into the under portion of the apparatus. Four similar leg portions 27 are disposed at the four corners of the support base a suitable distance above the supporting surface so as to permit free circulation of air through the expanded metal of the supporting base to cool the apparatus. It should be understood that the supporting base may be eliminated in certain instances wherein the remaining apparatus could be supported for example in a drawer or a multi-unit resistor assembly or the like. A supporting framework is disposed on the base, this supporting framework comprising a front plate 30, an intermediate plate 31 and a back plate 32 as seen in FIG. 7, the lower lateral portions of these plates being joined by lower side channel members 35 and 36 as seen in FIGS. 5 and 6 which extend longitudinally from the front plate to the back plate, these lower side channel members being suitably secured to each of plates 30, 31 and 32 as by welding and the like.

A pair of upper side frame members comprising bar-like members 39 and 40 which extend from the front plate to the rear plate and which are secured to the plates 30, 31 and 32 as by welding and the like. A first vertically extending member 42 is secured between members 35 and 39 of the frame and has a lifting handle 43 pivotally supported thereon.

A second vertically extending member 44 similar to member 42 is secured between members 36 and 40 and has a lifting handle 45 pivotally secured thereto. Obviously, handles 43 and 45 may be utilized for lifting the entire framework out of the base, if desired, and on the other hand the base may be secured to the framework as by suitable bolts or the like if desired.

A vertically extending motor support member 48 as seen in FIG. 10 is secured between members 35 and 39 adjacent the front plate 30 of the apparatus and serves to support a motor hereinafter described. A first cover plate 49 is removably secured to the outer surface of members 35 and 39 as by bolts or the like and closes the lateral space between front plate 30 and intermediate plate 31. A similar cover plate 50 is removably secured to the outer surfaces of members 36 and 40 of the framework as by bolts or the like and similarly closes the space between front plate 30 and intermediate plate 31 on the opposite side of the framework.

As seen in FIGS. 5 and 6, a first sheet of expanded metal 53 is secured to the inner surfaces of members 35 and 39 and extends vertically between these members from a point adjacent intermediate plate 31 to a point adjacent rear plate 32. A similar sheet of expanded metal 54 is secured to the inner surfaces of members 40 and 36 and extends therebetween from a point adjacent intermediate wall 31 to a point adjacent rear wall 32. These sheets of expanded metal will prevent the entry of undesired objects into the apparatus. A cover indicated generally by reference numeral 55 as seen in FIGS. 1 and 2 is provided for the over-all apparatus, cover 55 being peaked so as to provide an apex portion 56, the cover also including depending flange portions 57 and 58 which extend downwardly along the side portions of the framework. Cover member 55 is of such a dimension that it includes a longitudinally extending portion 60 which extends forwardly of the front plate 30 of the apparatus a substantial distance so as to protect those portions of the apparatus which extend forwardly of the front plate, the overhanging portion 60 preventing external objects from dropping downwardly upon these components. Cover 55 is also provided with a plurality of struck-out vents 62 which permit air to circulate through the cover member and downwardly into the apparatus.

It is apparent that the structure thus far described provides a very rigid protective framework which prevents any damage to the apparatus and at the same time adequate provision is provided for air circulation to ensure that the apparatus does not become overheated during use.

An input means as seen in FIG. 3 indicated generally by reference numeral 65 includes a portion 66 of insulating material which is secured as by means of nut and bolt assembly 67 to the rear plate 32 of the framework, this insulated portion extending through a suitable opening provided in the rear plate and including an outwardly extending electrical connector portion 70 which is adapted to be connected to a suitable electrical connector portion of conventional construction. It will be apparent that the input means can be of any desired construction as long as it is adapted to be connected to a suitable source of power. The electrical connector portion extends inwardly and is attached by means of nuts 71 and 72 to a bus bar means or connector plate 73, plate 73 being supported in position by the nuts 71 and 72.

A first resistance means 80 as seen in FIG. 3 has the rear end portion thereof connected to bus bar means 73 as by silver soldering and the like, the opposite end of this resistance means being connected to a connector member 81 more fully hereinafter described.

Resistance means 80 may comprise a resistance coil of No. 7 Nichrome wire in the form of a continuous coil having 52 turns. This coil is supported upon a plurality of insulator blocks 83 which are shown as being 4 in number, these insulator blocks being formed of a suitable insulating material such as porcelain or the like and having a relatively flattened cross-sectional configuration with substantially cylindrical peripheral surface portions which define only a small portion of the surface of a complete cylinder. These surface portions have grooves 85 formed therein which are substantially in the locus of a helix, the widths and depths of the grooves being such as to support the coil with a minimum of contact and with freedom of air circulation between the wire within each of the grooves.

Blocks 83 each have a central bore formed therethrough of polygonal cross section such as a square, the various blocks being supported upon a stainless steel rod 87 of similar cross-sectional configuration. The insulator blocks 83 are alternately disposed 90° relative to one another.

Rod 87 is supported within suitable openings provided in the intermediate and rear plates 31 and 32, the end portion of the rod adjacent rear plate 32 being threaded to receive an outer nut member 89 and an inner nut member 90 for retaining the rod in position. Sleeves 92 of suitable insulating material such as plastic and the like are disposed about the opposite ends of the rod adjacent the intermediate and the rear plates for limiting the movement of the resistance coil 80 toward these plates. Insulator blocks 83 are spaced from one another so as to be freely slidable on rod 87 whereby expansion and contraction of resistance coil 80 may occur during operation of the apparatus.

Three similar resistance coils 100, 101 and 102 are provided, these resistance coils each being connected at the rear end portions thereof to bus bar means 73 and being connected at the forward end thereof to connector members 103, 104 and 105 respectively which will be hereinafter more fully described.

Each of resistance coils 100, 101 and 102 may comprise a No. 4 Nichrome wire defining a continuous coil of 50 turns. Coils 100, 101 and 102 are respectively mounted upon insulator blocks 110, 111 and 112 which may be of the same construction as the insulator blocks 83 previously described. Insulator blocks 110, 111 and 112 are in turn mounted upon rods 113, 114 and 115 respectively which are supported between intermediate plate 31 and rear plate 32, the rods being received within suitable openings provided in these plates. Each of rods 113, 114 and 115 is provided with threads thereon adjacent the rear plate, and rod 113 is held in place by means of outer and inner nut means 113′ and 113″ while rod 114 is held in place by means of outer and inner nut means 114′ and 114″ and rod 115 is held in place by means of outer and inner nut means 115′ and 115″.

Insulating sleeves 117 of suitable material such as plastic or the like are disposed about opposite end portions of rod 113, similar insulating sleeves 118 and 119 being provided about opposite ends of rods 114 and 115 respectively.

A supporting panel member 112 as seen in FIG. 3 formed of suitable insulating material such as plastic or the like is supported on the front plate 30 by a pair of nut and bolt assemblies 124, 125.

An elongated bus bar 126 is provided, this bus bar 126 having a laterally extending extension 127 at one end portion thereof. Bus bar 126 is supported upon member 122 by means of nut and bolt assemblies 130, these nuts extending through suitable openings provided in members 122 and 126.

Member 122 is maintained in spaced relationship with respect to front plate 30 by means of a pair of spacer members 124′ and 125′ having openings therethrough through which the nuts of nut and bolt assemblies 124 and 125 extend.

Four spaced spring clip contact members 131, 132, 133 and 134 are secured to bus bar 126 by means of nut and bolt assemblies 135, the spring contact members being of conventional construction and including a pair of spaced legs between which a blade-type switch is adapted to be inserted, the natural resiliency of the contacts serving to tightly grip the blade-type switch between such leg portions.

The base portions of these spring clip contacts as most clearly seen in FIG. 3 are widened so as to readily receive the nut and bolt assemblies for securing them in operative position. As seen in FIG. 11, member 122 is provided with openings 136 which are adapted to receive the enlarged heads of the bolts of the nut and bolt assemblies 135.

As seen in FIG. 3, each of connector members 81, 103, 104 and 105 are of generally L-shaped configuration with one leg of the L operatively connected with the forward end of one of the resistance means 80, 100, 101 and 102 while the other leg of the connector extends forwardly through suitable openings provided through a heat insulating baffle plate 140 formed of asbestos or the like and secured to the rear face of intermediate wall 31, the openings in intermediate plate 31 being considerably larger than the forwardly extending portions of the connectors and the connectors being supported adjacent these openings by means of a support means 141 formed of suitable insulating material such as plastic and having openings therein snugly receiving the leg portions of the connectors. For example, insulating means 141 may comprise a pair of members which extend longitudinally above and below the legs of the connectors and having slots therein for snugly receiving the legs of the connectors. Support means 141 may be suitably secured to the intermediate plate 31 as by nut and bolt assemblies 142. The forward ends of each of connectors 81, 103, 104 and 105 are turned upwardly in a similar manner, the construction of connector 104 being seen most clearly in FIG. 11 wherein the upturned end portion is indicated by reference numeral 104′. Four spring clip contact members 145, 146, 147 and 148 as seen in FIG. 10 are supported at the lower portion of member 122 as seen in FIG. 11 directly beneath the previously described spring clip contact members by means of nut and bolt assemblies 150 which extend through suitable threaded openings provided in the base portions of the spring clip contact members and aligned threaded openings provided in the upstanding portions of the associated connector members adjacent thereto. In this manner, the lower spring contact members are electrically connected with the forward ends of connectors 81, 103, 104 and 105, and are rigidly held in position relative to support panel member 122.

Four blade switch members 152, 153, 154 and 155 as seen in FIG. 10 are pivotally supported by the leg portions of spring clip contact members 145, 146, 147 and 148 respectively by means of headed studs 157 which are threaded at the outer ends thereof and receive thereon nut members 158, studs 157 extending through suitable openings provided in the leg portions of the various spring clip members.

As seen particularly in FIG. 11, plate switch member 154 is connected to the outer bifurcated end portion of member 160 by means of a headed stud 161 which may be held in place by means of a hairpin-like spring 163 as seen in FIG. 10 seated within a suitable circumferential groove provided in the stud, this stud extending through suitable openings provided in such bifurcated end portion of the switch member.

Member 160 is embedded in the inner end portion of a switch handle indicated generally by reference numeral 166 formed of Bakelite or a similar insulating material, the switch handle defining an annular shoulder 167 for limiting inward movement of the switch handle, the switch handle also having an enlarged manually graspable knob portion 169 at the outer end thereof.

Three other similar switch handles are indicated generally by reference numerals 170, 171 and 172 as seen in FIGS. 2 and 3, these switch handles in turn being operatively connected with blade switch members 152, 153 and 155 respectively in the identical manner in which switch handle 166 is connected with blade switch member 154. In each case the inwardly extending portion of the switch handle extends through an opening in panel support member 122 and is freely slidable with respect to member 122 on the front plate 30 of the framework so that the blade switch members can readily be moved from the full line position as shown in FIG. 11 wherein the switches are disconnected from the bus bar 129 to the phantom line position shown in this figure where the switches are operatively connected with the bus bar 126.

An output means is indicated generally by reference numeral 175 as seen in FIG. 3 and includes a body of insulating material which is supported on the front plate 30 by means of nut and bolt assemblies 177. This output means includes an electrical connector member 180 formed of suitable electrically conductive material which extends inwardly of the insulating body, this inwardly extending portion 181 being connected by means of nut and bolt assemblies 182 to a connector member 185 formed of conductive material which is supported at the lower portion thereof by an insulator member 187 secured to the front plate 30. Connector member 185 includes an upwardly extending projection 188 as seen in FIG. 10 which is connected with the lower end of a fuse 190, the upper end of which is connected to the lateral extension 127 of bus bar 126.

Referring now to FIG. 15, it will be seen that operation of the blade switches 152, 153, 154, and 155 is adapted to connect different ones of resistances 80, 100, 101 and 102 between the input 65 and output 175. The resistances are so designed as described previously that closing of switch 152 will provide 40 amperes of current to the output when the device is connected with a constant 80 volt D.C. power source. Each of switches 153, 154 and 155 will individually provide a current of 80 amperes to the output when closed. It is accordingly evident that closing of different combinations of these switches is adapted to provide output currents varying in 40 ampere increments from 40 amperes to 280 amperes.

Figure 4:
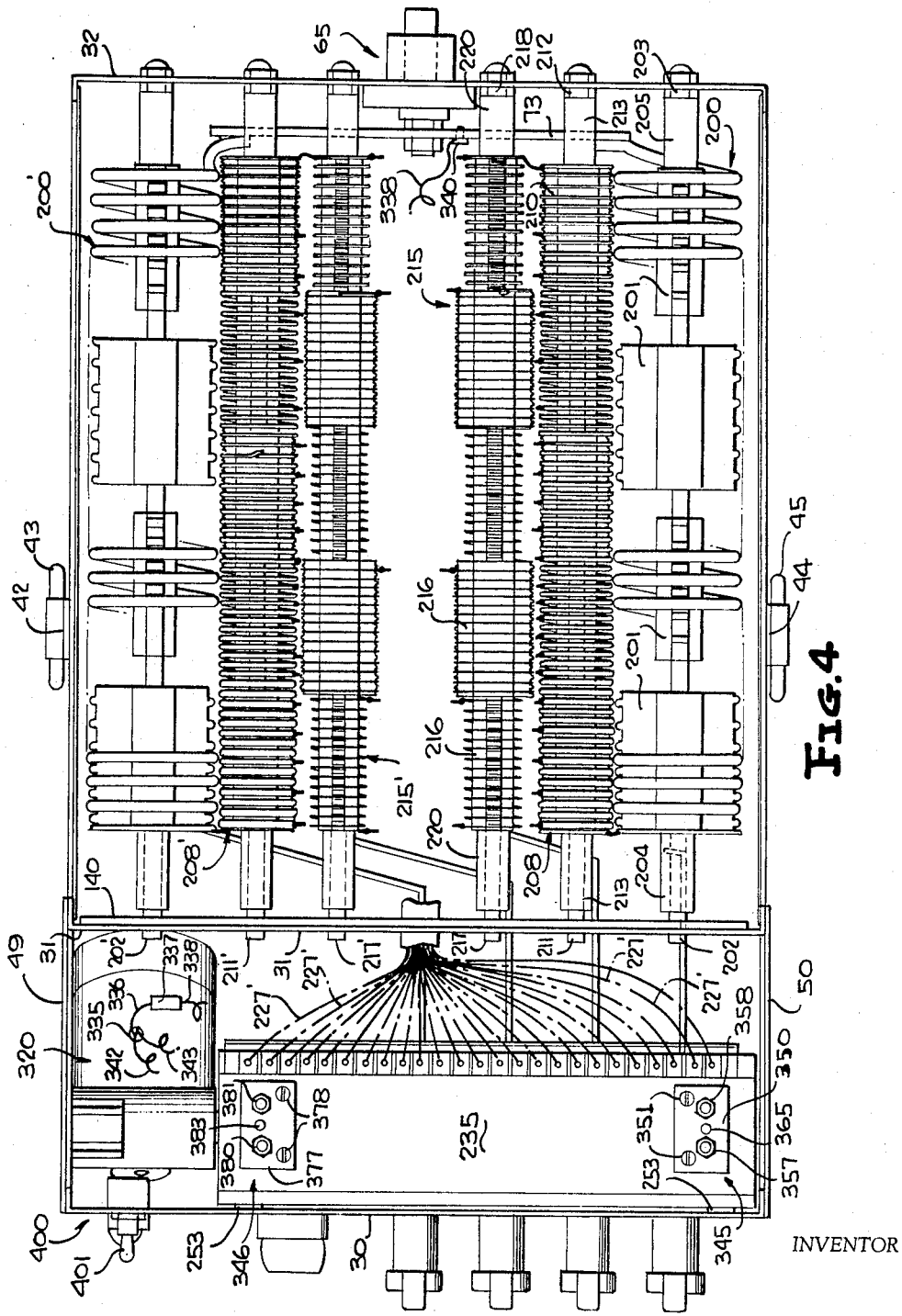
FIG. 4 is a bottom view of the unit.

A second resistance network is provided for providing small increments of amperage and as mentioned previously this network includes a dual path. Referring now particularly to FIG. 4 a first path in this latter network includes a first resistance coil 200 which has the rear end portion thereof operatively connected with bus bar means 73. Coil 200 may be formed of No. 10 Nichrome wire with 47½ turns. This coil is mounted upon insulator blocks 201 similar to those previously described, these insulator blocks being mounted upon a rod 202 similar to the rods previously described and supported between the intermediate and rear plates 31 and 32, the rod being held in place by nuts 203 threaded on the outer threaded end of the rod, insulating sleeves 204 and 205 being disposed about opposite ends of the rod. A coil 208 formed of Nichrome wire is supported upon suitable insulator blocks 210 mounted on a rod 211, this rod being held in place by nuts 212 and having insulating sleeves 213 disposed about opposite ends thereof. A further resistor coil 215 formed of Nichrome wire is mounted upon insulator blocks 216 which are in turn disposed on a rod 217 held in place by nuts 218, the rod having insulating sleeves 220 disposed about opposite ends thereof.

The forward end of coil 200 is connected with the forward end of coil 208 in turn being connected with the rear end of coil 215. It is accordingly apparent that coils 200, 208 and 215 are connected in series with one another. Coil 208 is a composite coil formed of a plurality of different sized wires all connected in series. The coil consists of the following sequence of wires connected in series from the forward end thereof to the rearward end thereof as seen in the drawings. Firstly, 15 turns of No. 10 Nichrome wire are provided which is in turn connected with 10 turns of No. 12 Nichrome wire in turn connected with 15 turns of No. 13 wire in turn connected with 24 turns of No. 16 wire which is in turn connected with 10 turns of No. 20 wire.

Referring now particularly to FIG. 9, a section through coil 208 illustrates the flattened cross sectional configuration of insulator blocks 210, and seen at the bottom of this figure is a typical copper tap indicated by reference numeral 222. These copper taps are tapped into the coil at suitable locations therealong so as to provide the desired incremental steps of amperage which as discussed previously may be 2 amperes in the present case. There are 21 such copper taps connected with coil 208 at the locations indicated by the dots on FIG. 4. All of these taps have not been shown in detail for the sake of clarity, it being understood that the taps may be spaced about the periphery of the coil as required in order to provide room for the leads attached thereto. In addition, the leads from these taps have been eliminated from the drawings in order to clarify the illustration, it being understood that a lead will extend from each of the taps to the remotely controlled switch means hereinafter described.

Coil 215 is also a composite coil and comprises a plurality of wires of different size connected in series and commencing at the rear end portion of the coil and moving forwardly thereof. The coil consists first of 12 turns of No. 20 Nichrome wire in turn connected with 53 turns of No. 24 Nichrome wire. The coil is provided with four copper taps as indicated by the dots on the drawing. Each of the taps associated with coils 208 and 215 are connected with suitable leads which may be bound into a bundle indicated generally by reference numeral 225 as seen in FIG. 5, this bundle of leads passing through suitable openings in the intermediate plate 31 and the insulating sheet 140, the individual leads 225' thereof being illustrated in FIG. 3 and being connected with the upper portion of the remotely controlled switch means as hereinafter described.

The other half of the dual path of this second resistance means is identical with that just described, and accordingly a detailed description thereof is not necessary. The components thereof are identical with those previously described and have been given the same reference numerals primed. It is accordingly apparent that the coils 201', 208' and 215' correspond exactly to and are identical with coils 200, 208 and 215 respectively and are interconnected in the same manner and provided with taps in the same manner. Each of the taps associated with coils 208' and 215' is provided with an individual lead, these various leads being collected in a bundle 227 which also extends through suitable openings provided in members 31 and 140, the individual leads 227' of this bundle then in turn being connected with the lower portion of the remotely controlled switch means as indicated in FIG. 4.

The remotely controlled switch means as seen most clearly in FIGS. 12–14 inclusive indicated generally by reference numeral 230 includes a forward wall portion 232, rear wall portion 233, an upper wall portion 234 and a lower wall portion 235, the ends of the switch means being closed by end walls 236 and 237. All of these wall portions are formed of a suitable insulating material such as plastic and the like.

Front wall portion 232 is secured to the front plate 30 by means of nut and bolt assemblies 240 as seen in FIG. 2, the walls 236 and 237 being secured to the front wall 232 by means of screws 236' and 237' as seen in FIG. 12 which are threaded into suitable threaded openings provided in the respective end walls. Rear wall 233 and a retaining plate 240 of a rigid material such as metal are secured to the end walls 236 and 237 by means of screws 242 and 243 threaded into suitable tapped openings in the end walls 236 and 237 respectively.

Top wall portion 234 is secured to the opposite end walls 236 and 237 by screws 245 and 246 respectively as seen in FIG. 10 which are threaded into suitable tapped openings provided in the respective end walls. The lower wall 235 is likewise secured in position by means of screws 247 and 248 which extend into tapped openings formed in the under surface of the walls 236 and 237 respectively.

A common contact member 250 as seen in FIG. 12 extends substantially throughout the length of the switch means and is secured to the inner surface of front wall 232 by a plurality of screws 251 which are threaded into suitable tapped openings provided in the bus bar 250. It should be noted that insulating spacers 253 as seen in FIG. 4 are provided for spacing the forward surface of front wall 232 of the remotely controlled switch means from the front plate 30 so as to ensure that the remotely controlled switch means will be completely insulated from the front plate.

Bus bar 250 as seen in FIG. 13 extends upwardly through a notch cut in top wall 234 and includes a laterally extending projecting portion 255. This portion 255 is connected by means of a jumper 256 with bus bar 126 previously described.

A plurality of electrically conductive laminates 260 as seen in FIG. 12 formed of copper or a similar good conductor are provided, these electrically conductive laminates being electrically insulated from one another by means of laminates 261 formed of suitable insulating material such as Bakelite or the like. As shown, sufficient laminates 260 are provided for connection to each of the leads 225' or 227' previously described, and in the present example as given, 25 such leads are provided and accordingly 25 laminates 260 are available. A pair of longitudinally extending securing rods 265 and 266 as seen in FIG. 13 are provided, the upper securing rod 265 extending through aligned openings in each of the laminates 260 and 261 and in the end walls 236 and 237 while the lower securing rod 266 extends through aligned openings provided in the laminates and the end walls. These securing rods serve to hold the laminates in place in the assembled relationship as shown, the rods being slipped into position and being of such a length as to terminate short of the opposite end faces of the end walls so as to permit suitable plugs of material to be inserted in the ends of the openings so as to retain the securing nuts in position.

Each of laminates 260 is provided with an upper and a lower bore 270 and 271 as seen in FIG. 13 extending therethrough from the rear face thereof to the forward face thereof. Threaded openings 270' and 271' are disposed within each of these laminates and extend substantially normally to the bores 270 and 271 respectively. Threaded set screws 272 and 273 are threadedly mounted within bores 270' and 271' respectively and are adapted to engage the outermost terminal ends 225" and 227" of the leads 225' and 227' respectively. With this arrangement, it is apparent that each of the leads 225' and each of the leads 227' is connected with one of laminates 260 of the remotely controllable switch means. As pointed out previously, a single connection to each of laminates 260 would suffice in certain circumstances, the dual path arrangement being employed because of certain design considerations.

The remotely controllable switch means includes a movable contact means indicated generally by reference numeral 276, this movable contact means including a main housing member 277 having a cover plate 278 secured thereto by means of a pair of screws 280 extending through suitable openings provided in member 278 and into tapped openings provided in member 277. A central longitudinally extending tubular metallic member 281 is permanently secured within the central portion of member 277 and extends through a central opening provided in member 278. Member 281 is provided with screw threads on the inner surface thereof for a purpose that will appear more clearly hereinafter.

Members 277 and 278 are formed of a suitable insulating material such as Bakelite or the like, member 277 being cut out in the interior thereof as seen most clearly in FIG. 13 to provide a first pair of recessed portions 283 and 284 in the face thereof, these recesses extending through the side walls 285 and 286 of member 277. Communication is provided between recesses 283 and 284 by a recess 288 formed in this face of member 277. In a similar manner a pair of lower recesses 290 and 291 are formed in the face of member 277 and open through the side edges 285 and 286 of member 277.

Communication is provided between recesses 290 and 291 by means of recess 293 as seen in FIG. 12. Four identical contact members 295 are disposed within recesses 283, 284, 290 and 291, the cover plate 278 when in place relative to member 277 providing an arrangement which snugly receives contact members 295 yet permits them to slide laterally of these members. Compression springs 296 bear against the inner surfaces of contact members 295 and are seated within suitable recesses 297 provided in main body member 277. It is apparent that the springs 296 will normally urge contact members 295 laterally outwardly into engagement with the common contact means 250 at one side of the switch means and into engagement with the laminates 260 at the other side of the switch means.

The upper contact members are connected with one another by a flexible copper strand wire 300 having the opposite ends thereof secured to the contact members and the lower contact members 295 are connected in a similar manner by a flexible wire 301, these wires being disposed within recesses 288 and 293 respectively whereby a good electrical connection at all times is ensured between opposite sides of the switch means.

Referring particularly to FIG. 14, it will be noted that the upper and lower edges of member 277 are provided with chamfers 304 and 305, and in a similar manner the upper and lower edges of cover plate 278 are provided with chamfers 307 and 308. These chamfers serve as cam surfaces for engaging and operating limit stop switch means as will hereinafter be explained. The chamfers are disposed at both the upper and lower edges as shown in the drawings, thereby making the movable contact means symmetrical so that it may be employed in either position thereof or in other words it may be employed in the position shown or a position rotated 180° from that shown.

Tubular member 281 of the movable contact means is threaded upon a threaded shaft 310 extending substantially throughout the length of the remotely controllable switch means, one end portion 311 of the threaded shaft being disposed within an opening 312 provided in end wall 237 while the other end portion of the shaft extends through an opening 314 provided in end wall 236 as seen in FIG. 8 and joins an enlarged portion 315 which is inturn connected with a pinion 316 which meshes with the drive gear output 318 of an electric motor indicated generally by reference numeral 320, the housing 321 of the electric motor supporting a bearing 322 which serves to journal the enlarged portion 315 previously described.

Motor 320 is provided with a mounting bracket 325 which includes a large central threaded opening 326 adapted to receive a screw 328 extending through a suitable opening in frame member 48 for securing the motor housing to frame member 48. The mounting bracket also includes a threaded opening 330 which receives a screw 331 also extending through a suitable opening 335 provided in frame member 48 for securing the motor housing in place relative to frame member 48.

As indicated in FIG. 4, the motor housing is provided with an opening through the under surface thereof through which suitable leads extend for controlling the motor. Power is supplied to the motor through a lead 336 which is connected through a fuse 337 to a lead 338 which in turn as seen at the righthand portion of FIG. 4 is connected at a point 340 to the bus bar means 73 previously described. It is accordingly apparent that power is transmitted directly from the input means of the apparatus to the motor 320. A pair of control leads 342 and 343 are provided for controlling operation of the motor in opposite directions, and the interconnection of these leads with the components of the device will be more fully hereinafter described.

A pair of limit stop switches are indicated generally by reference numerals 345 and 346 as seen in FIG. 4, these limit stop switches being mounted adjacent opposite ends of the remotely controllable contact means. Referring firstly to limit stop switch 345, a body means 350 formed of suitable insulating material such as Bakelite or the like is connected to the lower wall 235 of the remotely controllable switch means by a pair of screws 351 threaded into suitable tapped openings provided in wall 235.

As seen most clearly in FIG. 8 and FIG. 13, body means 350 is provided with a first recessed portion 354 which is in communication with a further central recessed portion 355. A pair of screws 357 and 358 extend downwardly through suitable passages provided in body means 350 and are provided with enlarged heads which are disposed within recess 354, contact washers 360 and 361 formed of copper or suitable good electrically conductive material being disposed beneath said heads. Nuts 362 are threaded on the lower ends of screws 357 and 358 for receiving suitable electrical contact members connected with leads hereinafter described.

A plunger member indicated generally by reference numeral 365 includes an enlarged upper portion 366 and a smaller lower portion 367 which extends slidably through a central opening provided in body means 350 and in communication with the lower portion of recess 355. A contact washer 370 engages the shoulder defined between portions 366 and 367, contact washer 370 being formed of a good electrically conductive material such as copper and being of such a dimension as to fit within recess 355 and providing a good electrical interconnection between contact washers 360 and 361. A compression spring 372 is disposed within recess 355 and engages against the under surface of contact surface 370 to normally urge the contact washer and plunger member 365 upwardly into the position shown in FIG. 13 so as to provide an electrical connection between contact washers 360 and 361. Upward movement of plunger 365 is limited by a retaining spring 374 secured in a suitable circumferentially extending groove provided in the lower portion 367 of the plunger member.

It will be noted that the upper end 375 of the enlarged portion 366 of plunger member 365 is rounded so as to in effect define a cam surface which will cooperate with the cam surface 308 defined at the bottom of member 278 of the movable contact means, the co-action between these members being such that when the movable contact means reaches a position adjacent the end of the remotely controllable switch means, plunger member 365 will be cammed downwardly due to contact between cam surface 308 and the upper cam surface 375 on the plunger member thereby moving contact washer 370 away from contact washers 360 and 361 thereby breaking the connection therebetween. The electrical circuit embodying this switch means will be hereinafter more fully described.

Limit stop switch means 346 is of identical construction with limit stop switch means 345, the body means 377 thereof being secured to the lower wall portion 235 of the remotely controlled switch means by screws 378, and a pair of downwardly extending screws 380 and 381 identical with screws 357 and 358 respectively being provided, a plunger member 383 identical with plunger member 365 also being provided.

It will be understood that the upper end portion of plunger member 383 is provided with a rounded cam surface adapted to engage the cam surface 305 provided on the lower portion of the movable contact means for opening the connection between contact screws 380 and 381 upon downward movement of plunger 383 as will be well understood in accordance with the discussion of the construction and operation of limit stop switch means 345.

A ground means is indicated generally by reference numeral 385 and as seen most clearly in FIG. 7, this ground means includes a central threaded stud 386 which extends through a first insulating body 387 and a second insulating body 388 including a portion extending through an opening provided in front plate 30. Three nuts 390, 391 and 392 are threadedly mounted on stud 386 for retaining the ground means in operative position and for securing a suitable lead to the inner portion thereof. A wing nut 393 is mounted on the outer end of the stud for connecting the outer end thereof to a suitable ground lead.

A manually operable switch is indicated generally by reference numeral 400 as seen in FIGS. 7, 10 and 16 and includes an outwardly extending manually graspable operating member 401. This switch is of a three-way type which is normally biased to a central position. Member 401 is connected with a terminal 403 which is always connected to ground, and may be moved in one direction to provide a circuit with terminal 404 or may be moved in the opposite direction to provide a circuit with terminal 405 thereof, the connections of these terminals in the electical circuit being hereinafter described.

A receptacle indicated generally by reference numeral 410 is threaded on the front plate 30 by means of nut and bolt assemblies 411 as seen in FIGS. 2 and 10 and is insulated from the front plate. This receptacle is provided with four terminals numbered 413, 414, 415 and 416. Terminals 413 and 414 are connected to ground as hereinafter more fully explained, while terminals 415 and 416 are connected with the remotely controllable switch means as hereinafter described.

The forwardly extending portion of the receptacle is adapted to receive a mating plug means 420 which is in turn connected with a flexible cable 421 which is connected with a foot operated control means 422. The foot operated control means includes a base member 425 upon which is rockably mounted an upper plate 426 which can be rocked to either side by an operator's foot to close the switches 427 or 428 depending on whether the operator wishes to increase or decrease the amperage of the welding current.

Closing of one of these switches will cause the motor 320 to be driven in one direction while closing of the other switch will cause the motor to be driven in the opposite direction thereby either increasing or decreasing the output amperage as desired.

For example, switch 427 may be connected in circuit between contacts 413 and 415 for closing the circuit to drive the motor in one direction while switch 428 may be connected in circuit between contacts 413 and 416 for closing the circuit and driving the motor in the opposite direction as will be well understood.

Referring now to FIG. 16, the circuit for driving the motor in opposite directions may be more fully understood. As seen in this figure, power is provided to the motor through leads 336 and 338 as previously described. The leads 342 and 343 for driving the motor in opposite directions extend respectively to the contacts 381 and 358 of the limit stop switch means 346 and 345 respectively. It is apparent that as long as these limit stop switch means are closed as is the normal condition, the circuit will then be completed from limit stop switch means 346 through lead 430 to terminal 416 of the receptacle 410 while the circuit will also be closed through limit stop switch means 345 and lead 431 to terminal 415 of the receptacle 410. Terminal 413 of the receptacle is connected to the ground means 385 by lead 435 while terminal 414 may be connected by means of lead 436 to the metallic framework of the apparatus to provide an equipment safety ground. It will also be noted that the central terminal 403 of manual switch 400 is connected to ground means 385 by means of a lead 437.

Terminal 404 of the manual switch means is connected with contact 380 of the limit stop switch means 346 by means of a lead 440 and terminal 405 of the manual switch means 400 is connected with contact 357 of limit stop switch means 345 by means of lead 441.

In operation, the input means 65 is connected with a suitable source of current such as a constant 80 volt potential D.C. power source. The switch means 166, 170, 171 and 172 are then closed to provide the minimum required welding current. As pointed out previously, these switch means may be operated to vary the output amperage in increments from 40 amperes in a range from 40 amperes to 280 amperes. Once this minimum required welding current is obtained, the remotely controlled switch means may be utilized for attaining the desired welding current over a continuous working range from the minimum setting to the minimum setting plus 50 amperes. When the welder desires to vary the current in increments of approximately two amperes the foot operated control means 422 is actuated while the welder is actually welding, and the welder can readily obtain either increases or decreases in the welding current by closing either the switch 427 or 428 of the remote control means by means of rocking his foot in different directions thereby causing the motor to be actuated in either one direction or the other for moving the movable contact means 276 of the remotely controlled switch back and forth within this remotely controllable switch means.

It is apparent that power is supplied to one side of the motor and that the circuit is completed through the limit stop switches and the remote control unit to ground.

The remote control unit 422 is normally biased to a neutral position such that when not actuated by the welder both of switches 427 and 428 will be open so that the circuit through the motor is not closed and the motor will be de-energized.

It will be noted that manual switch means 400 is connected in parallel with the remote control means so that the output current can also be readily controlled at the unit by actuating the manual switch means if desired.

When the movable contact means 276 approaches one end of the remotely controllable switch means, one or the other of the limit stop switch means 345 or 346 may be opened thereby opening the circuit from the motor through one of the remote switches 427 or 428. It is then impossible to drive the movable contact means any further in this direction, and accordingly, the other remote switch must then be actuated to move the movable contact means in the opposite direction until the opposite limit stop means may again open the circuit and limit the movement of the movable contact means in such opposite direction.

It is apparent from the foregoing that there is provided a new and novel remotely controllable current regulator which is especially adapted for use with welding equipment and which includes a first set of manually operable switches for providing adjustment of the output current in relatively large increments and over a wide range, and which further includes a remotely controllable switch means for providing from a remote position adjustment of the welding current in relatively small increments so as to continuously provide optimum welding conditions throughout a welding operation.

Limit stop switch means is provided for limiting movement of the remotely controlled switch means in opposite to thereby prevent excessive movement and damage to this switch means. The over-all construction of the apparatus is such as to provide a compact and very rigid and well protected unit while at the same time providing a construction which affords a maximum degree of accessibility of the components and which permits ready circulation of air thereabout to ensure adequate cooling.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A remotely controllable current regulator for supplying current to welding equipment comprising input means adapted to be connected to a source of constant electrical potential, output means adapted to be connected to welding equipment, first resistance means comprising a plurality of resistances each connected in parallel with one another and in series between said input means and said output means, separate individually, manually controllable switch means operatively associated with each of said resistances for selectively connecting each of said resistances with said output, said resistances providing rather large steps in the amount of amperage provided therethrough, second resistance means connected with said input means, remotely operable switch means including a common contact means at one side thereof connected with said output means and a plurality of separate contacts insulated from one another and connected with different portions of said second resistance means to provide different amounts of electrical current in relatively small increments to said separate contacts, movable contact means for selectively connecting different ones of said separate contacts with said common contact means and said output means so that said separate contacts are in series between said input and said output means and in parallel with said first resistance means, and means for remotely controlling the movement of said movable contact means for selectively engaging different ones of said separate contacts and remaining in engagement with a desired separate contact as long as desired to provide fine adjustments of amperage and to enable a desired adjusted amperage to be maintained at said output means as long as desired and further wherein said amperage may be readily increased or decreased as desired.

2. Apparatus as defined in claim 1 wherein said means for remotely controlling the movement of said movable contact means comprises a foot switch spaced a substantial distance from said movable contact means.

3. Apparatus as defined in claim 1 including drive means drivingly connected with said movable contact means for moving said movable contact means, said drive means being connected in an electrical circuit with said input means, and limit stop switch means connected in the circuit with said drive means and engageable with said movable contact means at opposite limits of movement of said movable contact means so as to limit movement of the movable contact means in either direction, said limit stop switch means including a switch member which is normally resiliently urged in one direction to close a circuit through said drive means, said last-mentioned switch member having a cam surface at one end portion thereof and being reciprocably mounted, said movable contact means having a cam surface at one end portion thereof and being reciprocably mounted, said movable contact means having cam surface means thereon for engaging the cam surface on said switch member of the limit stop switch means to reciprocate said switch member so as to open a circuit through said drive means to thereby de-energize the drive means.

4. Apparatus as defined in claim 1 wherein said movable contact means comprises a supporting means operatively driven by drive means, and a pair of contact members supported by said support means, means resiliently urging said contact members in opposite directions so as to respectively engage said common contact means and individual ones of said separate contact means, and means operatively electrically connecting said contact members so as to provide an electrical connection between said common contact means and said separate contacts.

5. Apparatus as defined in claim 1 wherein said movable contact means includes a housing means, said housing means defining recessed portions therewithin, four contact members separate and insulated from one another, each of said contact members being slidably positioned within one of said recessed portions, said contact members defining an upper pair of contact members and a lower pair of contact members, the contact members of each pair being normally resiliently urged in opposite directions, and means providing an electrical connection between the contact members of each pair of contact members to define a pair of parallel resistance paths each adapted to carry half of the current whereby the over-all dimension of the apparatus may be reduced to make a more compact and cheaper arrangement.

6. A current regulator for supplying current to welding equipment comprising input means for connection to a source of constant electrical potential, output means for connection to welding equipment, first resistance means comprising a plurality of resistances each connected in parallel with one another and in series between said input means and said output means, means for selectively connecting and disconnecting certain ones of said first resistance means between said input and said output means, each of said resistance means providing rather large steps in the amount of amperage provided therethrough, second resistance means connected in parallel with said first resistance means and in series between said input means and said output means, said second resistance means including selectively operable means for providing electrical current in relatively small increments in the amount of amperage provided therethrough.

References Cited by the Examiner
UNITED STATES PATENTS

| | | | |
|---|---|---|---|
| 1,280,713 | 10/1918 | Goldenstein | 323—94 |
| 1,948,377 | 2/1934 | Hacker | 323—94 |
| 2,305,206 | 12/1942 | Strobel | 323—94 |
| 2,680,225 | 6/1954 | Stevens | 323—94 |

JOHN F. COUCH, *Primary Examiner.*

A. D. PELLINEN, *Assistant Examiner.*